(12) United States Patent
Radomski et al.

(10) Patent No.: US 8,579,061 B2
(45) Date of Patent: Nov. 12, 2013

(54) VEHICLE COMPARTMENT COVER COUPLING

(75) Inventors: John A. Radomski, Inkster, MI (US); William W. Baynes, Highland, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 282 days.

(21) Appl. No.: 13/011,224

(22) Filed: Jan. 21, 2011

(65) Prior Publication Data

US 2012/0186044 A1 Jul. 26, 2012

(51) Int. Cl.
*B62D 25/12* (2006.01)
*E05D 7/00* (2006.01)

(52) U.S. Cl.
USPC ........................... 180/69.2; 180/274

(58) Field of Classification Search
USPC ............... 180/69.2, 69.21, 274; 16/382
See application file for complete search history.

(56) References Cited

U.S. PATENT DOCUMENTS

| | | | |
|---|---|---|---|
| 3,643,755 A * | 2/1972 | Gionet et al. .............. | 180/69.21 |
| 3,815,176 A | 6/1974 | Porter | |
| 3,828,885 A | 8/1974 | Eissinger et al. | |
| 3,938,610 A | 2/1976 | Harman | |
| 3,956,793 A | 5/1976 | Jewell | |
| 4,012,807 A | 3/1977 | Kern | |
| 5,058,237 A * | 10/1991 | Mahr .............................. | 16/225 |
| 5,197,560 A | 3/1993 | Oda et al. | |
| 5,718,019 A | 2/1998 | Cheal | |
| 6,513,617 B2 * | 2/2003 | Sasaki et al. .................. | 180/274 |
| 7,802,345 B2 * | 9/2010 | Mathew et al. ................. | 16/370 |
| 2007/0062748 A1 * | 3/2007 | Erwin ........................ | 180/69.21 |
| 2007/0256277 A1 * | 11/2007 | Shaw ............................ | 16/343 |
| 2009/0194348 A1 * | 8/2009 | Faubert et al. ............. | 180/69.21 |
| 2009/0250945 A1 | 10/2009 | Hwang | |
| 2009/0283347 A1 | 11/2009 | Boggess et al. | |
| 2010/0140005 A1 * | 6/2010 | Kisiler et al. ................ | 180/69.2 |

* cited by examiner

*Primary Examiner* — Paul N Dickson
*Assistant Examiner* — Timothy Wilhelm
(74) *Attorney, Agent, or Firm* — Frederick A. Krieger

(57) ABSTRACT

A vehicle compartment cover coupling that moveably couples a vehicle compartment cover to a main body of a vehicle for movement of the vehicle compartment cover between an open position and a closed position. The cover coupling includes a first member that is coupled to the main body of the vehicle. The cover coupling further includes a second member that is coupled to the vehicle compartment cover, wherein the second member is moveably coupled to the first member. The vehicle compartment cover coupling further includes a retaining coupling that is operable to engage the first and second members together during a vehicle impact condition. The retaining coupling engages the first and second members to limit movement of the compartment cover in a first predetermined direction during the vehicle impact condition. The retaining coupling further includes a deformable portion configured and positioned to deform in a second predetermined direction during the impact to limit movement of the vehicle compartment cover in the first direction.

18 Claims, 3 Drawing Sheets

VEHICLE COMPARTMENT COVER COUPLING

FIELD

The following relates to a vehicle compartment cover coupling and, more particularly, relates to a vehicle compartment cover coupling with movement-limiting capability.

BACKGROUND

Vehicles typically include a compartment cover, such as a front hood that covers a front compartment (e.g., engine compartment) when in a closed position and that moves to an open position to reveal the compartment. Vehicles can also include a hood coupling, such as a hinge assembly, for coupling the hood to the main vehicle body with movement between the open and closed positions.

Vehicle hoods can also include various movement-limiting features. For instance, vehicle hoods can include one or more features that control or limit movement of the vehicle hood during a vehicle impact. Specifically, some vehicles can include a movement-limiting feature that minimizes or inhibits the hood from moving rearward toward the windshield during a vehicle impact.

SUMMARY

A vehicle compartment cover coupling that moveably couples a vehicle compartment cover to a main body of a vehicle for movement of the vehicle compartment cover between an open position and a closed position is disclosed. The vehicle compartment cover coupling includes a first member that is coupled to the main body of the vehicle. The vehicle compartment cover coupling also includes a second member that is coupled to the vehicle compartment cover, wherein the second member is moveably coupled to the first member. The vehicle compartment cover coupling further includes a retaining coupling that is operable to engage the first and second members together during a vehicle impact condition. The retaining coupling engages the first and second members during the vehicle impact condition to limit movement of the compartment cover in a first predetermined direction. The retaining coupling also includes a predetermined (deformable) portion configured and positioned to deform in a second predetermined direction to limit movement of the compartment cover in the first direction.

In one exemplary embodiment, the deformable portion plastically deforms to engage the first and second members to limit movement of the vehicle compartment cover in the second direction.

In one embodiment, the retaining coupling is configured so the deformable portion rotates about another member during deformation of the deformable portion.

In one embodiment, the retaining coupling is configured to include a striker member and a retaining member, wherein the retaining member is configured to receive the striker member when the vehicle compartment cover moves from the open position to the closed position, and when the deformable portion deforms the retaining member tends to remain engaged with the striker member.

A vehicle hood coupling that moveably couples a vehicle hood to a main body of a vehicle for movement of the vehicle hood between an open position and a closed position is also disclosed. The vehicle defines a rearward direction and a cross vehicle direction. The vehicle hood coupling includes a first member that is coupled to the main body of the vehicle. The coupling also includes a second member that is coupled to the vehicle hood, and the second member is moveably coupled to the first member. The second member includes a deformable portion that plastically deforms in the event of a vehicle collision. The hood coupling further includes a striker member that is coupled to the first member, and the striker member includes a first portion and a second portion. Moreover, the hood coupling includes a retaining member that is coupled to the second member, and the retaining member defines a slot with a variable width. The retaining member receives the first portion via the slot when the vehicle hood moves between the open position and the closed position. Also, the width of the slot reduces when the deformable portion plastically deforms to retain the engagement of retaining member with the first portion of the striker member between the second portion and the first member to limit movement of the vehicle hood relative to the main body in the rearward direction and in the cross vehicle direction.

Further areas of applicability of the present disclosure will become apparent from the detailed description and claims provided hereinafter. It should be understood that the detailed description, including disclosed embodiments and drawings, are merely exemplary in nature, intended for purposes of illustration only, and are not intended to limit the scope of the invention, its application or use. Thus, variations that do not depart from the gist of the invention are intended to be within the scope of the invention.

DETAILED DESCRIPTION

Disclosed herein are exemplary embodiments of a vehicle compartment cover coupling. The coupling operably joins the cover to the main body of the vehicle between an open position and a closed position. The coupling includes one or more features configured and positioned to minimize compartment cover movement in a first predetermined direction when the vehicle is under an impact condition and the cover is in a closed position. The coupling is further configured and positioned so a predetermined portion of the coupling deforms in a second predetermined direction during the impact condition in a manner to limit and minimize the compartment cover movement in the first predetermined direction. The features can be separate components joined with the coupling, the features can be integral portions of the coupling, and the features can include a variety of structural and material configurations, and combinations thereof, such that deformation of the predetermined (deformable) portion occurs in a desired predetermined direction under the impact condition to limit cover movement in the first predetermined direction.

Figure 1:
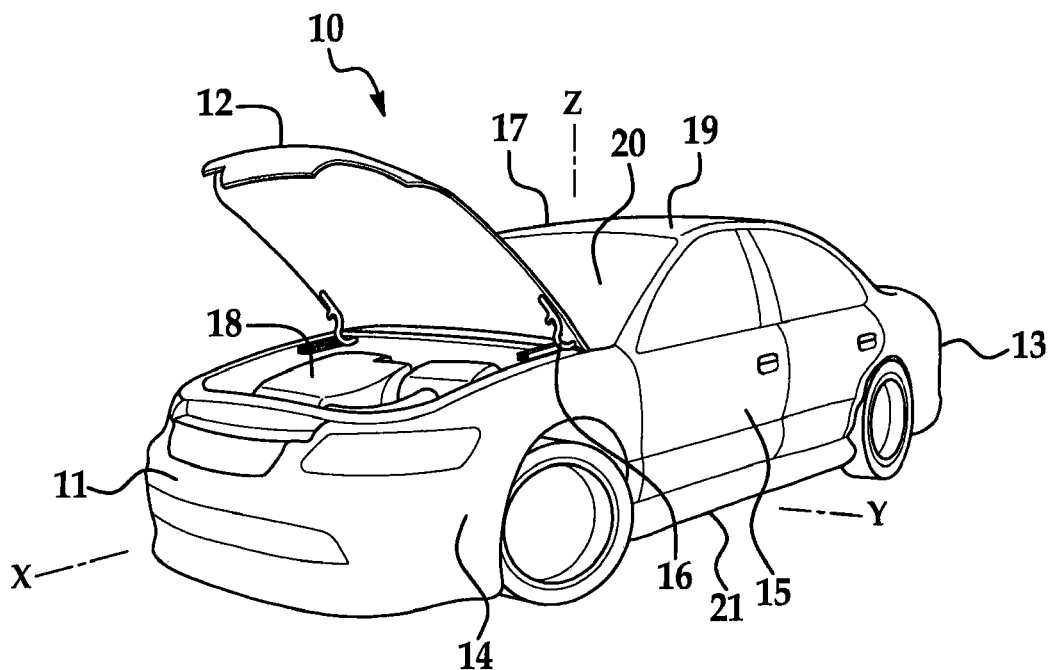
FIG. 1 is a perspective view of a vehicle with a compartment cover coupling, such as a vehicle hood coupling according to various exemplary embodiments of the present disclosure.

Referring initially to FIG. 1, a vehicle 10 is illustrated according to various exemplary embodiments of the present disclosure. Although the vehicle 10 illustrated is a car, it will be understood that the vehicle 10 can be a truck, sport utility vehicle, van, or any other vehicle 10 without departing from the scope of the present disclosure.

The vehicle 10 can include a front end 11, a rear end 13, a first side 15, and a second side 17. Moreover, the vehicle 10 can define a roll (longitudinal) axis X, a pitch (transverse) axis Y, and a yaw (vertical) axis Z. Furthermore, the vehicle 10 can define a rearward direction generally along the roll axis X from the front end 11 to the rear end 13. The vehicle 10 can also define a cross or transverse vehicle direction generally along the pitch axis Y from the first side 15 to the second side 17 or from the second side 17 to the first side 15. Additionally, the vehicle 10 can define an upward/downward direction generally along the yaw axis Z.

Furthermore, the vehicle 10 can include a vehicle compartment cover, here hood 12, which is moveably coupled to a vehicle main body 14 via a vehicle hood/cover coupling 16. The vehicle hood 12 can move between an open position and a closed position relative to the main body 14. In the closed position, the hood 12 can cover a front compartment 18, which can house an engine or other items. In the open position, the hood 12 can reveal and provide access to the front compartment 18. Moreover, the vehicle 10 can include a windscreen or windshield 20.

As will be discussed, the vehicle hood coupling 16 can include features that effectively limit movement of the vehicle hood 12 in one or more predetermined directions while the vehicle hood 12 is in the closed position during a vehicle collision or vehicle impact. For instance in an exemplary embodiment, the hood coupling 16 includes features configured to limit movement of the hood 12 toward the rearward direction during a vehicle impact condition under which the hood 12 may be pushed toward the rear of the vehicle due to the impact. In another exemplary embodiment, the hood coupling 16 includes features configured to limit movement of the hood 12 in a combination of directions, such as partially along the rearward direction and partially along the cross vehicle direction, during a vehicle impact condition under which the hood 12 may be pushed toward those directions. For instance, in a non-limiting example, the coupling can be configured to limit movement of the hood along a 45 degree line (a first predetermined direction) in the X-Y plane that is partially directed toward the windshield during the impact condition. It is understood that more than one impact condition may result in the vehicle hood 12 being urged in a predetermined direction with respect to the vehicle, whether the vehicle is moving or stationary.

In an exemplary embodiment and referring now to FIGS. 2-4, the vehicle hood coupling 16 will be discussed in greater detail. As shown, the coupling 16 can generally include a first member 22 and a second member 24. The first and second members 22, 24 can each be made out of any suitable material, such as metal (e.g., steel, HSS, aluminum, etc.), plastic, composite and combinations thereof. Also, the first and second members 22, 24 can each be cast, machined, fabrications including welded and bolted portions, and uniform, monolithic pieces of bent or otherwise formed constructions.

The first member 22 can be coupled (e.g., fixed) to the main body 14 of the vehicle 10 (e.g. panel, chassis, frame, fender or combinations thereof), and the second member 24 can be coupled (e.g., fixed) to the hood 12 of the vehicle 10. Also, the first and second members 22, 24 are configured to be moveably coupled together to move the hood between the open and closed positions. For instance, the first and second members 22, 24 can be hingeably coupled via a pin 25 and a nut 27 such that the first and second members 22, 24 rotate relative to each other about a single pivot axis A only. Thus, the first and second members 22, 24 can define a form of a "gooseneck" type coupling or hinge assembly for the hood 12 as will be discussed. However, it will be appreciated that the first and second members 22, 24 can be moveably coupled in any other suitable fashion and can define any other type of hinge assembly without departing from the scope of the present disclosure.

Figure 3:
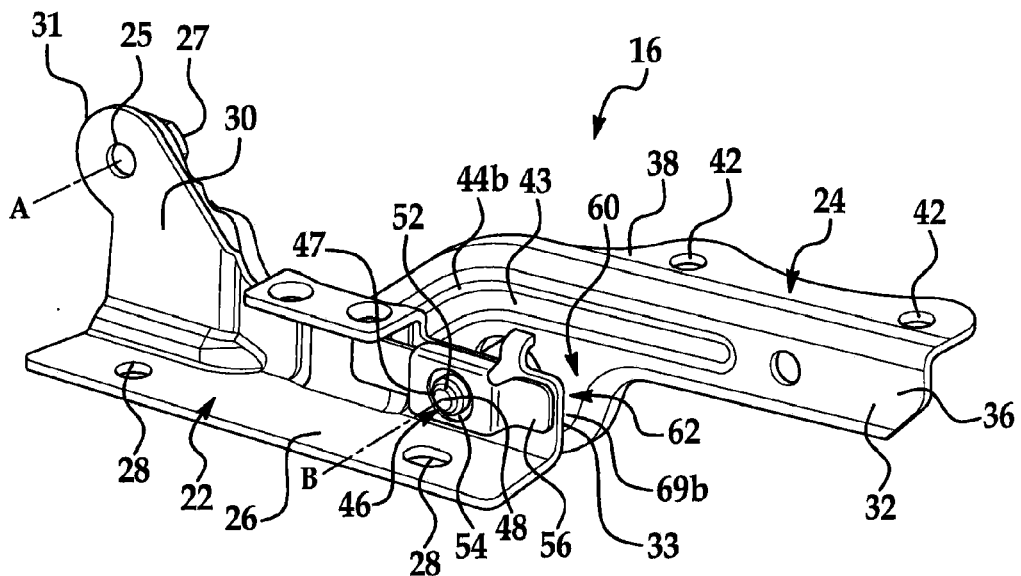
FIG. 3 is a perspective, outboard view of the vehicle hood coupling of the vehicle of FIG. 1 according to various exemplary embodiments of the present disclosure.

As shown in FIG. 3, the first member 22 can include a baseplate 26. The baseplate can be welded or bolted to the vehicle. For example in FIG. 3, the baseplate 26 can include one or more locating apertures 28 for precisely positioning the baseplate about a locational feature such as a pin and thereafter, welding or bolting the baseplate to the main body 14 (e.g., to the chassis) of the vehicle 10.

The first member 22 can also include a flange 30. The flange 30 can extend away from the baseplate 26. In some embodiments, the flange 30 can extend approximately perpendicularly away from the baseplate 26. The flange 30 can include a first (rear) end 31 and a second (forward) end 33.

Figure 2:
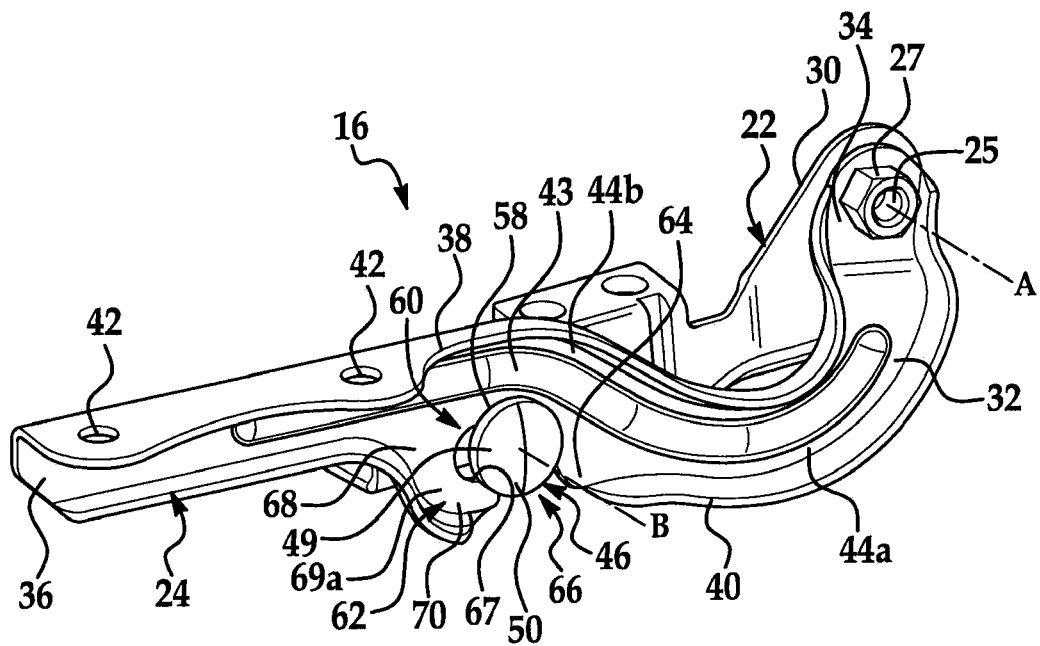
FIG. 2 is a perspective, inboard view of a vehicle hood coupling of the vehicle of FIG. 1 according to various exemplary embodiments of the present disclosure.
Figure 4:
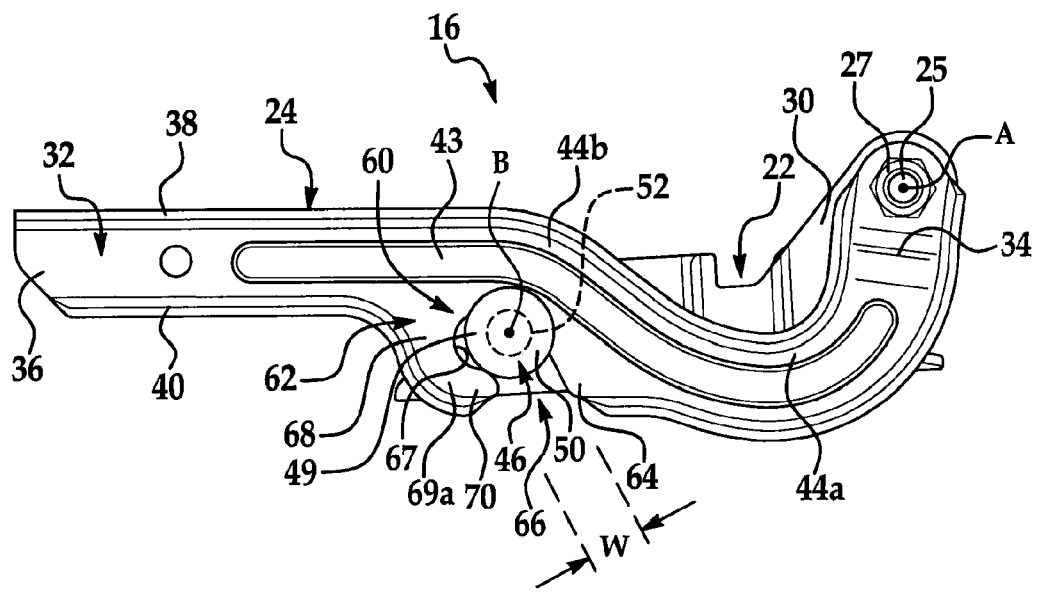
FIG. 4 is a side view of the vehicle hood coupling of the vehicle of FIG. 1 in an un-deformed state.

Also, as shown in FIGS. 2 and 4, the second member 24 can include a base 32 with a first (rear) end 34 and a second (forward) end 36. The base 32 can be curved between the first and second ends 34, 36. In some embodiments, the base 32 can be curved in a "gooseneck" shape such that the base 32 extends downward from the first end 34, then gradually upward, then horizontally, and terminating at the second end 36.

The second member 24 can also include an upper flange 38 and a lower flange 40, which each extend away from the base 32 of the second member 24. In some embodiments, the upper and lower flanges 38, 40 can extend approximately perpendicularly away from opposite sides of the base 32. The upper flange 38 can include one or more apertures 42, and fasteners (not shown) can extend through respective apertures 42 to operably couple (e.g., fix) the upper flange 38 to the vehicle hood 12. In some embodiments, apertures are utilized with locational features, like pins, for positioning the second member, and thereafter bolt or weld the second member to the hood.

Moreover, the second member 24 can include a rib 43 that extends longitudinally along the base 32. The rib 43 can be formed in any suitable fashion, position and configured to increase a stiffness (e.g. bending) of the second member 24 relative to a predetermined orientation.

In exemplary embodiments, the vehicle compartment cover coupling includes a retaining coupling that is operable to engage the first and second members together during a vehicle impact condition. The retaining coupling further engages the first and second members to limit movement of the compartment cover in a first direction. The retaining coupling also includes a deformable portion that deforms in a predetermined direction to engage the first and second members to limit movement of the vehicle compartment cover in the first direction. The retaining coupling can be incorporated into the cover coupling as separate components joined together with the remainder of the cover coupling, or integral portions of the first and second members, and combinations thereof.

In one exemplary embodiment, the deformable portion plastically deforms in a first direction to engage the first and second members to limit movement of the vehicle compartment cover in the second direction. In one exemplary embodiment, the deformable portion of the second member plastically deforms to engage the first member limiting movement of the vehicle compartment cover in the second direction. In some embodiments, the retaining coupling is configured so the deformable portion rotates about another member during deformation of the deformable portion. In one embodiment, the retaining coupling is configured to include a striker member and a retaining member, wherein the retaining member is configured to receive the striker member when the vehicle compartment cover moves from the open position to the closed position, and when the deformable portion deforms the retaining member tends to retain the striker member. In some embodiments, movement of the cover in one or more vehicle directions may be limited even though the retaining coupling has not deformed.

In an exemplary embodiment as shown in FIGS. 2 and 4, the second member 24 can also include a first deformable portion 44a and a second deformable portion 44b. As will be discussed, the first and second deformable portions 44a, 44b can be specifically intended to deform (elastic and/or plastic deformation) along a predetermined direction, in the event of a vehicular impact. For instance, the first deformable portion 44a can be located adjacent the first end 34, approximately where the base 32 begins to curve upward. Also, the second deformable portion 44b can be located between the first and second ends 34, 36, approximately where the base 32 begins to curve horizontally. Intended deformation of these portions 44a, 44b can be ensured, in one configuration, by reducing the amount of material in these portions 44a, 44b, by locating the portions 44a, 44b in areas that undergo comparatively higher stress during the impact, or by any other means (e.g. utilizing different materials). Thus, in exemplary embodiments shown in FIG. 5, the first and second deformable portions 44a, 44b can deform (e.g., plastically in some embodiments) in a substantially controlled manner to limit, minimize, or otherwise inhibit movement of the vehicle hood 12 toward the rearward direction and in the cross vehicle direction as will be discussed in greater detail.

The hood coupling 16 can also include a striker member 46. The striker member 46 can include a first portion 47 and a second portion 49. The first portion 47 can include a post 48 (FIG. 3), and the second portion 49 can include a head 50.

The post 48 can be substantially cylindrical with a straight longitudinal axis B that extends substantially in the cross vehicle direction. For instance, axis B of the post 48 can extend substantially parallel to axis Y of the vehicle 10 in some embodiments, or in other embodiments, axis B can extend at an angle relative to axis Y, parallel to the X-Y plane. However, it will be understood that the post 48 can have any other suitable shape and can extend in another direction. Also, the post 48 includes an outer surface 52, which is partially shown in FIG. 3 and which is shown in phantom in FIG. 4.

The post 48 can be fixedly coupled to the flange 30 of the first member 22, adjacent the second end 33. In some embodiments, the post 48 can be fixed to the flange 30 via welding, fasteners, or any other means.

In other embodiments, striker member 46 can be moveably coupled to the flange 30. For instance, as shown in FIG. 3, member 46 can be moveably coupled to the flange 30 via a floating nut 54. More specifically, the post 48 portion of member 46 can extend through a hole (not shown) in the flange 30 and can be threadably attached to the floating nut 54 on the opposite side of the flange 30. Also, the floating nut 54 can be moveably contained within a cage 56 that is fixed to the flange 30. Accordingly, tolerances can be relaxed because member 46 is moveably coupled to the flange 30.

In other embodiments, the post 48 portion of member 46 can be moveably coupled to the flange 30 via a J-shaped or U-shaped fastener (not specifically shown). This fastener can be bent to extend over both sides of the flange 30, and the post 48 can extend through one end of the fastener, through an aperture in the flange 30, and threadably attach to the far end of the fastener. The aperture in the flange 30 can be large enough to allow member 46 to move relative to the flange 30.

As shown in FIGS. 2 and 4, the head 50 can be substantially disc-shaped and can radiate and extend transversely away from axis B of the post 48, for instance, parallel to the X-Z plane (FIG. 1). As such, the diameter of the head 50 is greater than that of the post 48. In this configuration, if the first member 22 and the second member 24 are urged apart in the vehicle cross direction, for example due to an impact event, the head 50 will tend to prevent the separation. The head 50 can be operably coupled to the post 48. In some embodiments, the head 50 can be fixed to the post 48, for instance, via welding. In other embodiments, the head 50 can be integrally attached to the post 48 so as to be monolithic (e.g., via machining, cold forming, or casting). The head 50 can be coupled to an end of the post 48 opposite the flange 30 such that a head surface 58 (FIG. 2) faces the flange 30 and such that the head 50 is spaced apart at a distance away from the flange 30.

As shown in FIGS. 2 & 4, the hood coupling 16 can further include a retaining member 60. The retaining member 60 can include a hook 62 shaped feature and a projection 64 feature that are each joined to the second member 24, between the first and second ends 34, 36. In some embodiments, the hook 62 and projection 64 of the retaining member 60 can be integrally joined to the second member 24 so as to be monolithic. In other embodiments, the hook 62 and projection 64 can be removably connected to the second member 24. The hook 62 and the projection 64 cooperate to define a first side surface 69a (FIGS. 2 & 4) and a second side surface 69b (FIG. 3) of the retaining member 60. The first side surface 69a faces the head 50 and the second side surface 69b faces the flange 30 of the first member 22.

A slot 66 can be defined between the hook 62 and the projection 64. More specifically, a slot surface 67 defines the slot 66. The width W of the slot 66 (FIGS. 4, 5, and 6) can vary, for instance, at the initial design along the hook length and during a vehicular impact condition. When the deformable portions 44a, 44b deform, the width W can be reduced to limit movement of the vehicle hood 12. For example, when the deformable portions 44a, 44b deform, the width W will be reduced to envelop at least a portion of the post 48 and restrict the movement of the vehicle hood 12. In this embodiment, cover movement is limited in a first direction toward the windshield 20 when the deformable portions rotate in a second direction and the hook 62 engages a portion of the post to retain the hook against the post.

As shown in FIG. 4, the hook 62 can include a first portion 68 that extends generally downward from the second member 24 and a second portion 70 that extends generally rearward toward the projection 64. Also, the projection 64 can be rounded and can project downward and forward from the second member 24. As such, the slot 66 can extend partially upward and partially forward.

Figure 6:
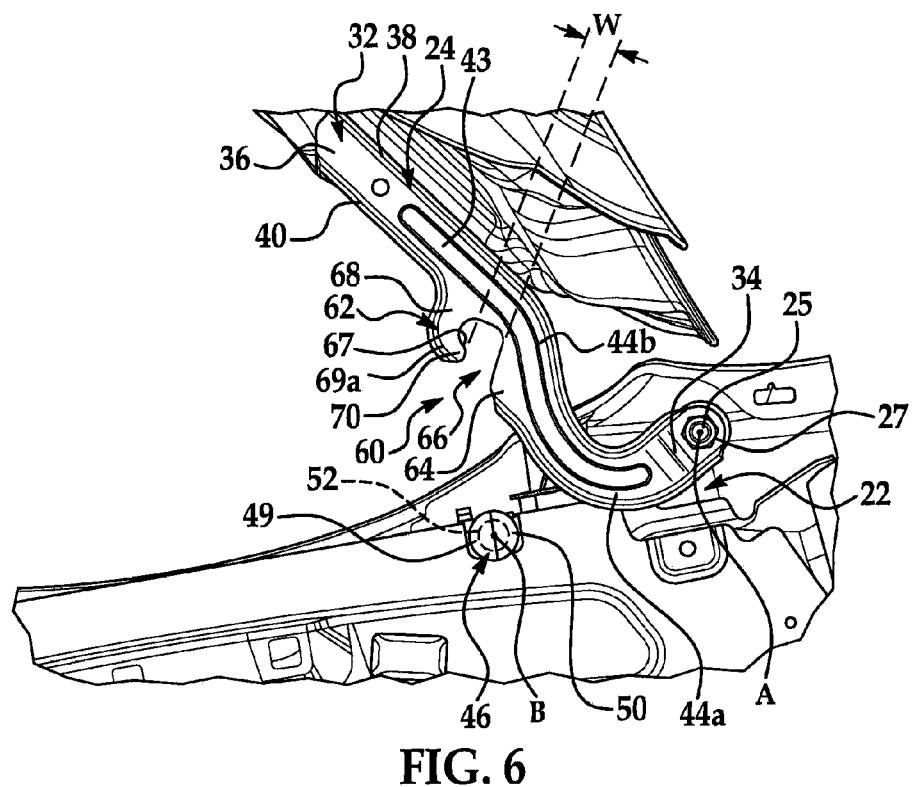
FIG. 6 is a side, inboard view of the vehicle hood coupling with the vehicle hood shown in an open position.

As shown in FIG. 4, the slot 66 is configured to receive the post 48 when the vehicle hood 12 is closed. Then, as shown in FIG. 6, when the vehicle hood 12 is moved to its open position, the hook 62/slot 66 can move away from the post 48. Accordingly, the width W of the slot 66 can be large enough to allow the hook 62/slot 66 to move over and away from the post 48 without interference, in the undeformed condition.

Figure 5:
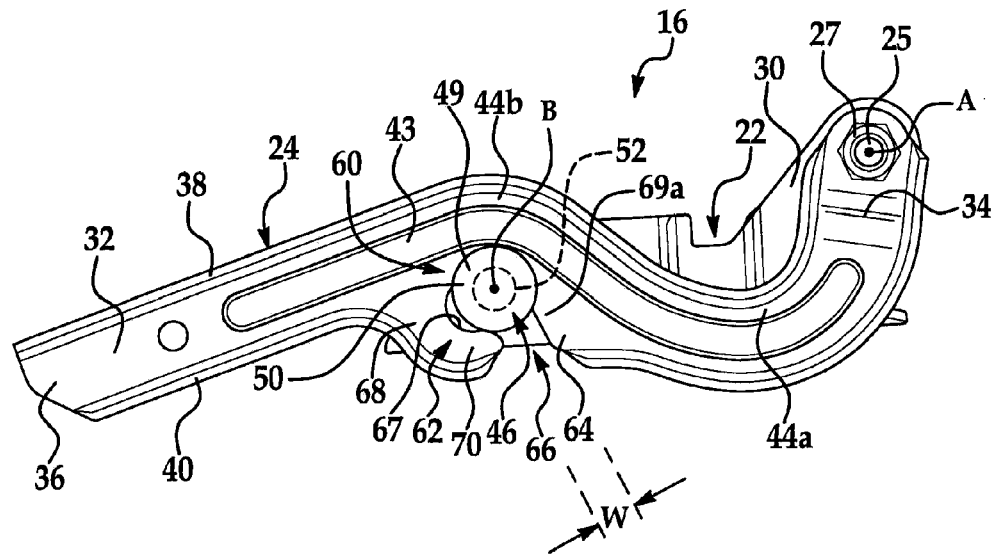
FIG. 5 is a side view of the vehicle hood coupling of the vehicle of FIG. 1 in a deformed state.

However, FIG. 5 illustrates how the hood coupling 16 may deform during a vehicle impact. For purposes of discussion, it will be assumed that the vehicle impact occurs proximate the intersection of the front end 11 and one of the sides 15, 17 of the vehicle 10 (i.e., a front-angular impact).

As shown in FIG. 5, the collision can cause the deformable portions 44a, 44b to deform, and depending on the impact magnitude, plastic deformation can result. For example, the first deformable portion 44a can bend generally downwards and the second deformable portion 44b can bend generally upwards. As such, the hook 62 and the projection 64 can move toward each other to reduce the width W of the slot 66 and such that the retaining member 60 becomes retained on the post 48 between the head 50 and the flange 30 of the first member 22. This deformation and the dynamics of the impact can also cause the outer surface 52 of the post 48 to abut against the slot surface 67 to limit movement of the vehicle hood 12 in the rearward direction. Also, the side surface 69a can abut against the outer head surface 58 of the head 50 to limit movement of the vehicle hood 12 in the cross vehicle direction. Moreover, the side surface 69b can abut against the flange 30 to limit movement of the vehicle hood 12 in the opposite cross vehicle direction.

Accordingly, the vehicle hood coupling 16 can significantly decrease the likelihood of the vehicle cover/hood 12 moving predetermined directions, e.g. in the rearward and cross vehicle direction during a vehicle impact. Thus, the hood coupling 16 is configured to minimize, limit, or inhibit movement of the hood toward the windshield 20. Moreover, the vehicle hood coupling can be made relatively compact. The striker member 46 and the retaining member 60 can be integrated relatively easily and inexpensively into an existing hood coupling design. In one alternative embodiment, the first member 22 can be configured so when formed (e.g. machined, casting, molded, composite constructions) the striker member 46 or a portion thereof, e.g. post 48, can be an integral portion of the first member. Likewise, tooling used to manufacture existing hood couplings need not be modified significantly in order to manufacture the vehicle hood coupling. It is also contemplated that the principles disclosed herein for the hood coupling could be applied to other vehicle cover compartments, for example, to a vehicle trunk lid coupling the lid to the vehicle body.

What is claimed is:

1. A vehicle compartment cover coupling that moveably couples a vehicle compartment cover to a main body of a vehicle for movement of the vehicle compartment cover between an open position and a closed position, the vehicle compartment cover coupling comprising:
    a first member that is coupled to the main body of the vehicle; and
    a second member that is coupled to the vehicle compartment cover, the second member being moveably coupled to the first member; and
    a retaining coupling that is operable to engage the first and second members together during a vehicle impact condition, the retaining coupling engaging the first and second members to limit movement of the compartment cover in a first predetermined direction, the retaining coupling also including a deformable portion configured and positioned to deform in a second predetermined direction during the vehicle impact condition to limit movement of the vehicle compartment cover in the first direction,
    wherein the retaining coupling includes a striker member that is coupled to one of the first member and the second member, and wherein the retaining coupling also includes a retaining member that is coupled to the other of the first member and the second member, wherein the retaining member defines a slot that receives the striker member when the vehicle compartment cover moves from the open position to the closed position, the width of the slot reducing when the deformable portion deforms to retain the retaining member on the striker member; and
    the vehicle defines a downward direction and a rearward direction, and wherein the retaining member includes a hook that extends generally in the downward direction and generally in the rearward direction, the hook extending about a first portion of the striker member when the deformable portion plastically deforms.

2. The vehicle compartment cover coupling of claim 1, wherein the first direction is along a vehicle rearward direction and the second direction is a cross vehicle direction.

3. The vehicle compartment cover coupling of claim 1, wherein the deformable portion plastically deforms to engage the first and second members to limit movement of the vehicle compartment cover in the first direction.

4. The vehicle compartment cover coupling of claim 1, wherein the deformable portion rotates about the striker member during deformation of the deformable portion.

5. The vehicle compartment cover coupling of claim 1, wherein the striker member includes a first portion and a second portion that extends transversely away from the first portion, wherein the retaining member is retained on the first portion of the striker member between the second portion of the striker member and the first member when the deformable portion deforms.

6. The vehicle compartment cover coupling of claim 5, wherein the first portion is a post with an axis and the second portion is a head that radiates away from the axis.

7. The vehicle compartment cover coupling of claim 1, wherein the striker member is connected to the first member and the retaining member is connected to the second member.

8. A vehicle hood coupling that moveably couples a vehicle hood to a main body of a vehicle for movement of the vehicle hood between an open position and a closed position, the vehicle defining a rearward direction and a cross vehicle direction, the vehicle hood coupling comprising:
    a first member that is coupled to the main body of the vehicle;
    a second member that is coupled to the vehicle hood, the second member being moveably coupled to the first member, the second member including a deformable portion that plastically deforms in the event of a vehicle collision;
    a striker member that is coupled to the first member, the striker member including a first portion and a second portion; and
    a retaining member that is coupled to the second member, the retaining member defining a slot with a variable width, the retaining member receiving the first portion via the slot when the vehicle hood moves from the open position to the closed position, the width of the slot reducing when the deformable portion plastically deforms to retain the retaining member on the first portion of the striker member between the second portion and the first member to limit movement of the vehicle hood relative to the main body in the rearward direction and in the cross vehicle direction.

9. The vehicle hood coupling of claim 8, wherein the first portion of the striker member includes a post with a post longitudinal axis, and wherein the second portion of the striker member includes a head, the head extending transversely away from the post longitudinal axis.

10. The vehicle hood coupling of claim 9, wherein the post includes an outer surface, wherein the head includes a head surface that faces the first member, wherein the retaining member includes a slot surface that defines the slot, wherein the retaining member also includes a side surface, wherein the slot surface of the retaining member abuts the outer surface of the post when the deformable portion plastically deforms to limit movement of the hood in the rearward direction, and wherein the side surface of the retaining member abuts the head surface when the deformable portion plastically deforms to limit movement of the hood in the cross vehicle direction.

11. The vehicle hood coupling of claim 9, wherein the post longitudinal axis extends substantially in the cross vehicle direction, and wherein the head radiates away from the post longitudinal axis.

12. The vehicle hood coupling of claim 8, wherein the vehicle defines a downward direction, and wherein the retaining member includes a hook feature that extends generally in the downward direction from the second member and generally in the rearward direction, the hook extending about the first portion of the striker member when the deformable portion plastically deforms.

13. The vehicle hood coupling of claim 12, wherein the retaining member includes a projection that projects from the second member, and wherein the slot is defined between the hook feature and the projection.

14. The vehicle hood coupling of claim 13, wherein the hook feature and the projection are integrally coupled to the second member so as to be monolithic.

15. The vehicle hood coupling of claim 8, wherein the first portion of the striker member is moveably coupled to the first member.

16. The vehicle hood coupling of claim 8, wherein the first portion of the striker member is fixedly coupled to the first member.

17. The vehicle hood coupling of claim 8, wherein the second portion of the striker member is integrally coupled to the first portion of the striker member so as to be monolithic.

18. The vehicle hood coupling of claim 8, wherein the first member and the second member are hingeably attached for rotation about a single pivot axis only.

* * * * *